United States Patent
Young

(10) Patent No.: US 7,300,010 B2
(45) Date of Patent: Nov. 27, 2007

(54) SPOOL OSCILLATION

(76) Inventor: John N. Young, 35 Berry Trail, Fairfax, CA (US) 94930

( * ) Notice: Subject to any disclaimer, the term of this patent is extended or adjusted under 35 U.S.C. 154(b) by 0 days.

(21) Appl. No.: 11/581,275

(22) Filed: Oct. 16, 2006

(65) Prior Publication Data

US 2007/0114315 A1    May 24, 2007

(51) Int. Cl.
  *A01K 89/01* (2006.01)
(52) U.S. Cl. .................... 242/242; 242/278
(58) Field of Classification Search ........... 242/241, 242/242, 278
  See application file for complete search history.

(56) References Cited

U.S. PATENT DOCUMENTS

| | | | |
|---|---|---|---|
| 5,921,489 A * | 7/1999 | Shibata | 242/242 |
| 6,264,125 B1 * | 7/2001 | Cockerham et al. | 242/242 |
| 6,655,620 B2 * | 12/2003 | Huat | 242/242 |
| 6,971,600 B2 * | 12/2005 | Cheung | 242/242 |
| 7,025,295 B2 * | 4/2006 | Wiest | 242/242 |
| 7,188,794 B2 * | 3/2007 | Ban et al. | 242/242 |
| 2007/0029425 A1 * | 2/2007 | Young | 242/242 |

* cited by examiner

*Primary Examiner*—Emmanuel M Marcelo

(57) ABSTRACT

In a reel with an oscillation system, a sinusoidal correction force applied to the normal oscillation function to produce an improved line lay on the reel spool.

6 Claims, 7 Drawing Sheets

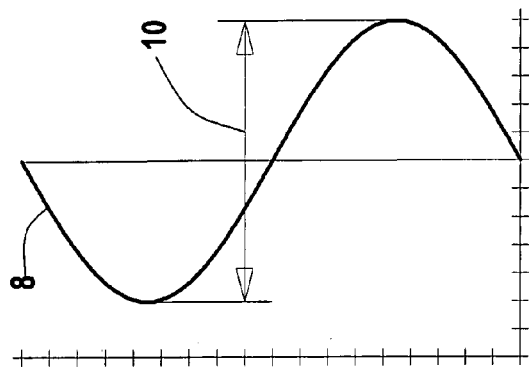
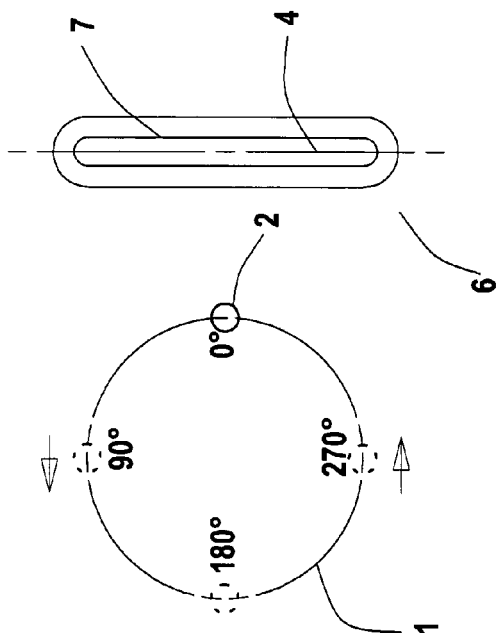
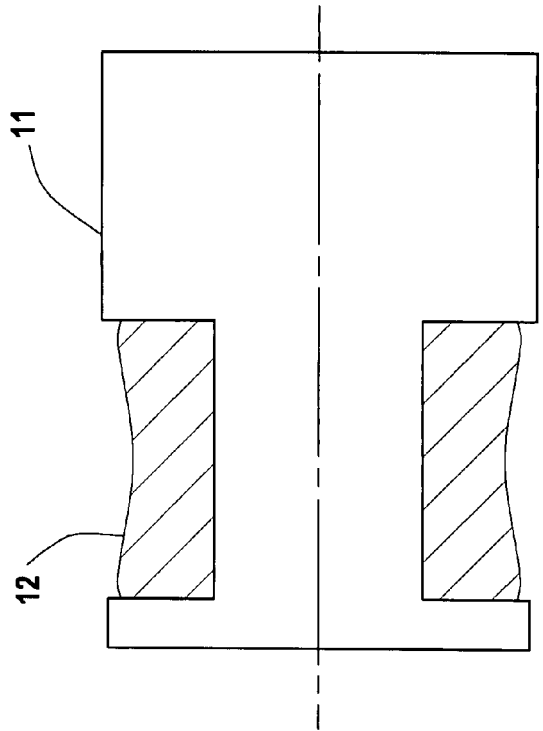
FIG 1D
FIG 1C
FIG 1B
FIG 1A
PRIOR ART

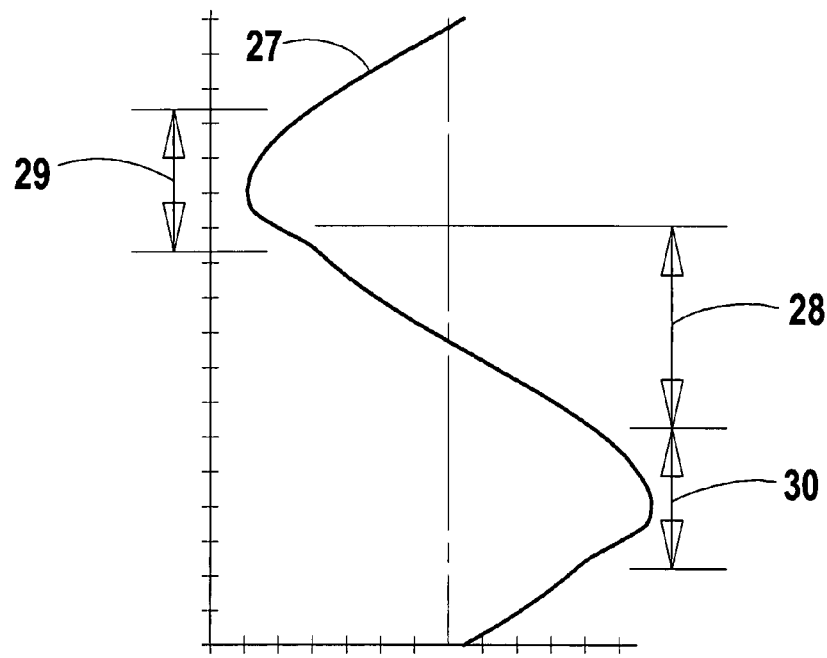
FIG 3A
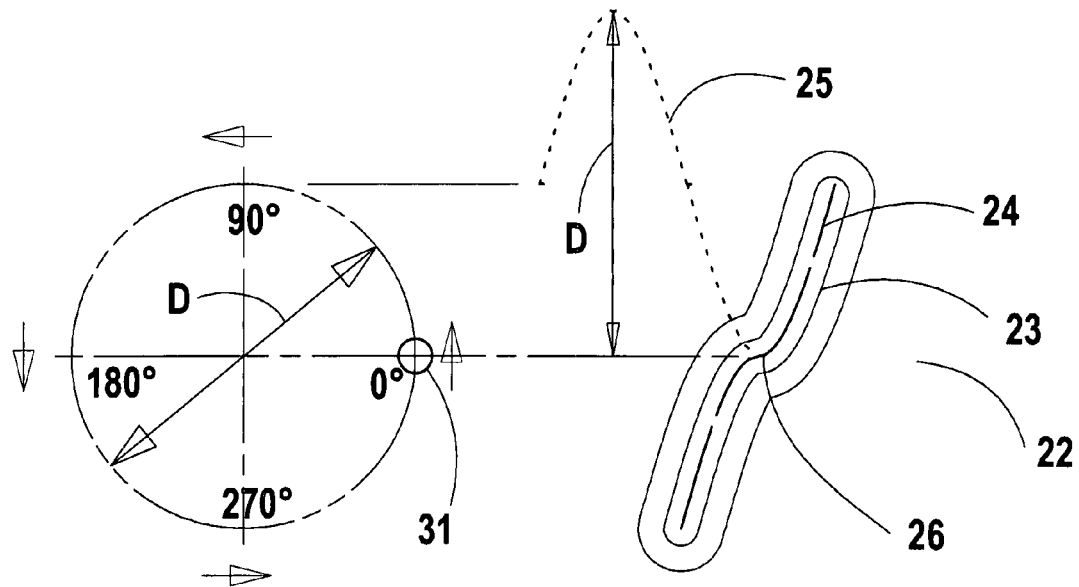
FIG 3B
FIG 3C

REVISED

SPOOL OSCILLATION

CROSS-REFERENCE TO RELATED APPLICATIONS

The following references are considered relative prior art.

U.S. Pat. No. 4,773,611

U.S. Pat. No. 5,427,324

U.S. Pat. No. 5,364,041

U.S. Pat. No. 6,264,125

DE 40 35 846 C2

STATEMENT REGARDING FEDERALLY SPONSORED RESEARCH OR DEVELOPMENT

Not applicable

REFERENCE TO SEQUENCE LISTING, TABLE, OR DISK APPENDIX

Not applicable

BACKGROUND OF THE INVENTION

Spinning reels are typically designed with an internal oscillation system to oscillate their associated spool back and forth beneath a rotating winding member. The function of the oscillation system directly affects the winding of line on said spool with one characteristic of the line winding being the flat lay of line. The flattest possible lay of line is a desirable characteristic of spinning reels.

PURPOSE OF THE INVENTION

The purpose of this invention is to provide an improved fishing reel oscillation system for improved winding of line on a reel spool.

BRIEF DESCRIPTION OF THE DRAWINGS

FIG. 1A is a reel spool showing the uneven line lay of prior art.

FIG. 1B is the oscillation pin and its circular path of prior art.

FIG. 1C is the oscillation block of prior art.

FIG. 1D is the oscillation speed curve of prior art.

FIG. 3A is the speed curve of a first idealized oscillation system of the invention.

FIG. 3B is the oscillation pin and its path description related to the speed curve of FIG. 3A.

FIG. 3C is the oscillation block related to the speed curve of FIG. 3A.

DETAILED DESCRIPTION OF THE INVENTION (FIG. 1) FIGS. 1A through 1D illustrate (illustrates portions of a standard) prior art spinning reel oscillation (system) systems. Spinning reels typically utilize an oscillation system with a rotating oscillation gear upon which is fixed an oscillation pin 2 moving along circular path 1. The oscillation pin is positioned to ride within a groove 7 formed about centerline axis 4 in oscillation block 6, and the oscillation block is fixed through a drive shaft, not shown, to spool 11 of the spinning reel such that as the oscillation pin rotates around its circular path the spool is urged alternately in a first oscillation direction and then in a second and opposite oscillation direction under a winding member, not shown, of the reel.

Oscillation stroke 10 is defined as the distance that the oscillation block and its associated spool travel in one full 360° rotation of the oscillation gear.

The speed of the oscillation stroke directly affects the flatness of the (line wound onto) line-lay on the spool. Since the oscillation pin rotates along a circular path, a (typical) prior art oscillation block with a straight groove urges the oscillation block back and forth such that it produces a sinusoidally shaped speed curve 8 and forces uneven line-lay 12 on the spool.

Figure 2B:
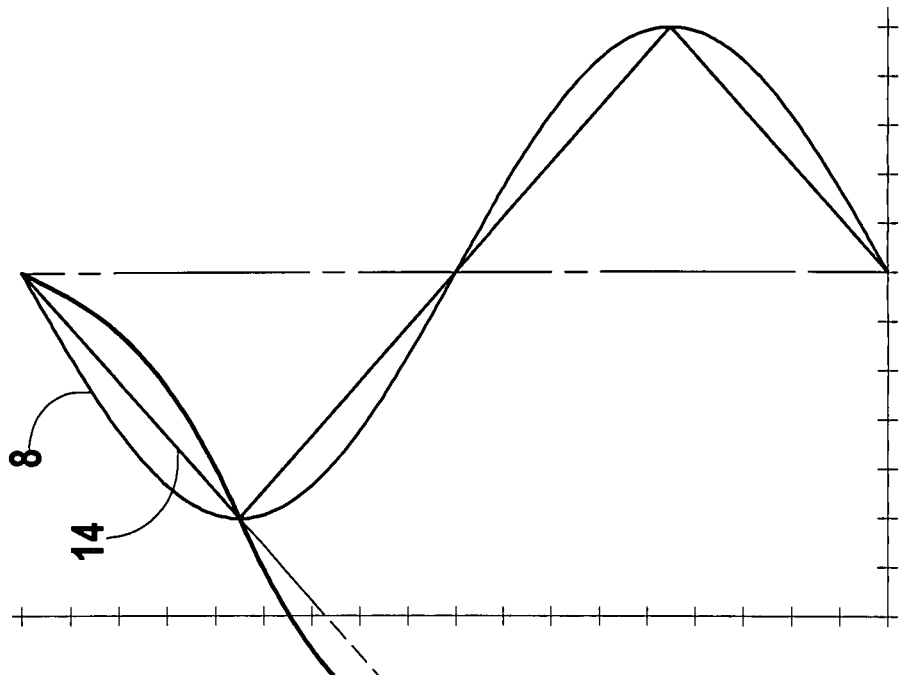
FIG. 2B is a plot showing a desired sinusoidal correction to the speed curve of prior art.
Figure 2A:
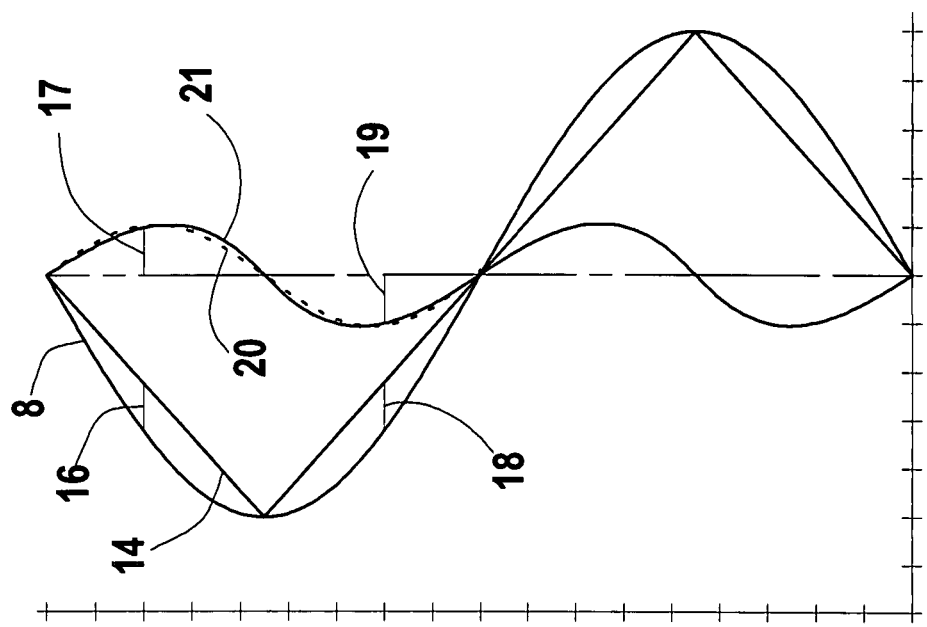
FIG. 2A is a plot showing the differences between the speed curves of prior art and an ideal oscillation speed curve.

In (FIG. 2) FIG. 2A a theoretically perfect oscillation speed curve 14 is characterized by an unchanging straight-line slope between oscillation stroke extremes and an instant direction change at both ends of the oscillation stroke. Proper design of the oscillation block groove can alter a standard sinusoidal speed curve to approach the perfect oscillation straight-line speed curve in order to produce a flat line-lay on the spool.

If an oscillation block is designed to produce an output correction in synchronized opposition to the sinusoidal urging of the rotating oscillation pin, then an optimum correction may be approached to flatten the line wind on the spool. By plotting the standard sinusoidal speed curve 8 on top of the ideal speed curve 14 any number of error measurements 16, 18 may be measured. These error measurements may be plotted 17, 19 respectively along a straight line axis to produce correction curve 21. Correction curve 21 is not sinusoidal, and true sinusoidal curve 20 reveals the difference between correction curve 21 and a true sinusoidal curve.

It can be seen that a true sinusoidal correction curve 21 may be established by plotting the same error measurements 16, 18 along the ideal straight-line speed curve, 14.

The curve comparisons of (FIG. 2 imply) FIGS. 2A and 2B indicate that a properly aligned sinusoidal curve correction function dimensioned by the oscillation pin's rotational path may be considered a basis for designing a correction shape to the oscillation block to achieve an optimal oscillation speed curve.

(FIG. 2) FIGS. 2A and 2B (demonstrates) demonstrate that in order to alter the function of a standard sinusoidal oscillation speed curve 8 to produce an ideal straight line curve 14 there is a requirement to apply a sinusoidal correction function 21 in synchronized opposition to said standard oscillation speed curve 8.

In the oscillation system of (FIG. 3) FIGS. 3A, 3B and 3C, oscillation block 22 shows an oscillation pin groove 23 shaped around a sinusoidal center line 24. The continuation of the sinusoidal centerline 25 is sketched to illustrate the complete sinusoidal curve on which the oscillation block centerline is based. The sinusoidal centerline's amplitude D is dimensionally identical to the oscillation pin path diameter D.

Figure 4:
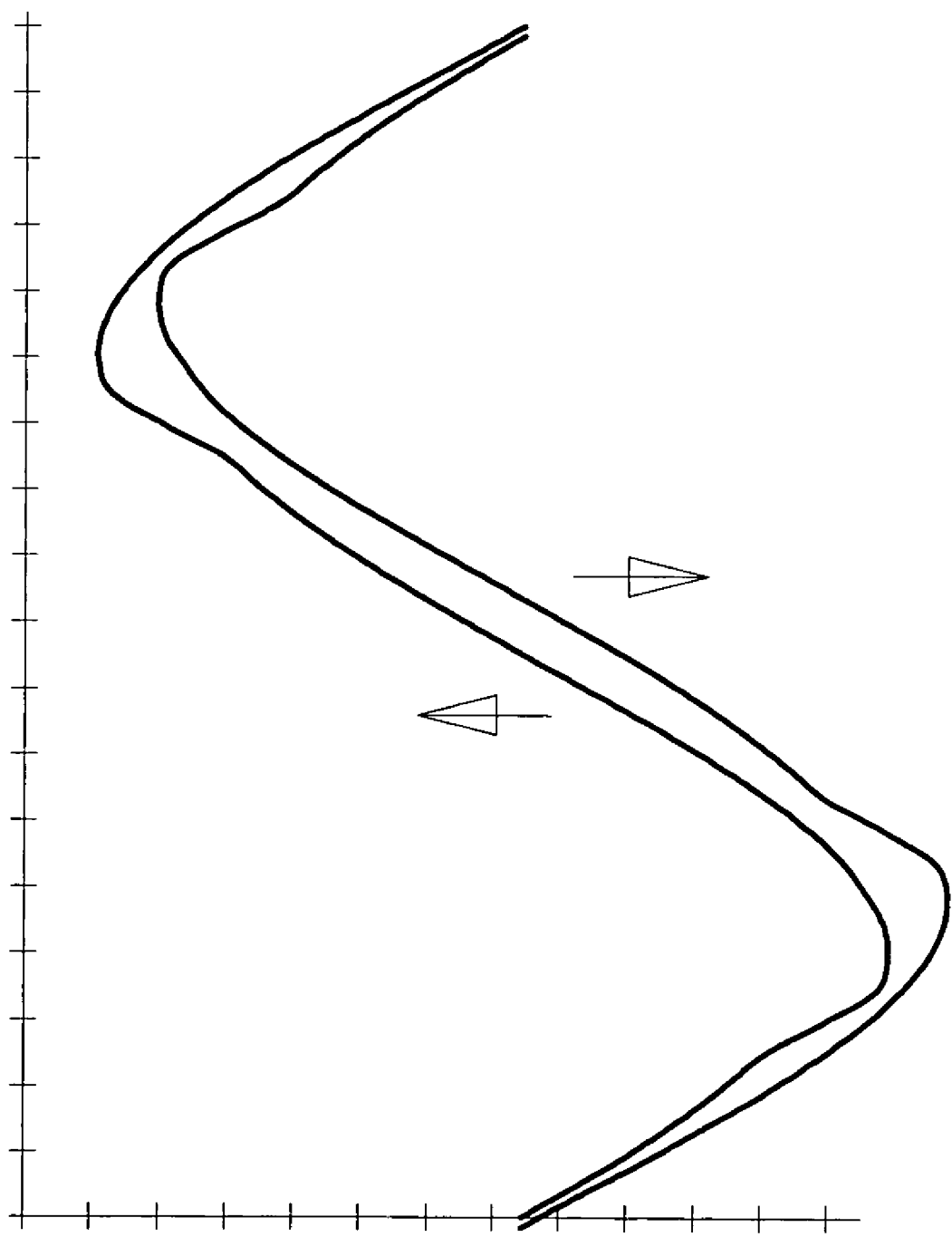
FIG. 4 is the speed curve of FIG. 3A mirrored and superimposed on itself to easily compare the speed curve in both directions of oscillation.

The resultant speed curve 27 of sinusoidal oscillation block 22 indicates a much flatter and improved center section 28 and quicker direction changes 29, 30 than the (conventional) prior art sinusoidal oscillation speed curve of (FIG. 1) FIG. 1D. Speed curve 27 is mirrored and superimposed upon itself in FIG. 4 to allow a visual comparison of the speed curve in both oscillation directions (of the FIG. 3 system).

While the oscillation system of (FIG. 3 is) FIGS. 3A, 3B and 3C are theoretically correct, it has a functional flaw. When oscillation pin 31 is at either the 0° or 180° position, the oscillation pin is pushing either perpendicularly up against or perpendicularly down against the horizontally aligned walls of the oscillation block, and there is no urging in either of the two oscillation directions and the system can jam. It is therefore necessary to modify (the design of FIG. 3) oscillation block 22 in order to allow the oscillation system to function correctly.

Any modification to (the FIG. 3 oscillation system) oscillation block 22 should also consider making center section 28 (of the FIG. 3 system) flatter, the direction changes 29, 30 quicker and both directions of the oscillation speed curve retrace the exact same plot.

Figure 5B:
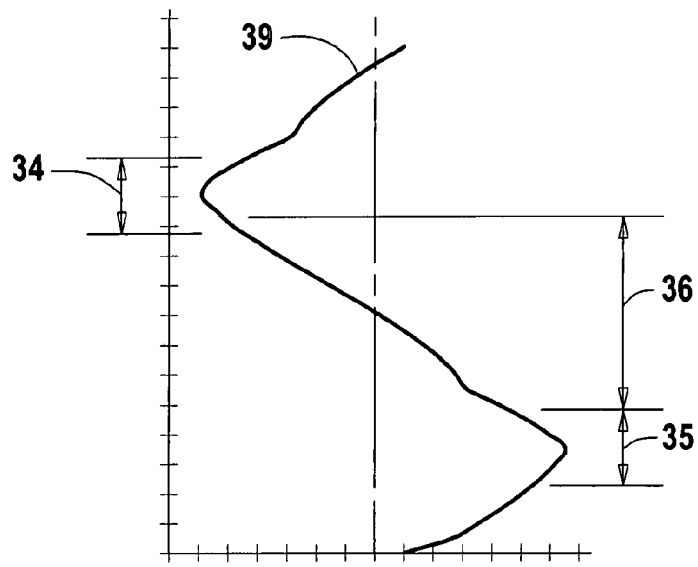
FIG. 5B is the speed curve related to the oscillation block of FIG. 5A.
Figure 5C:
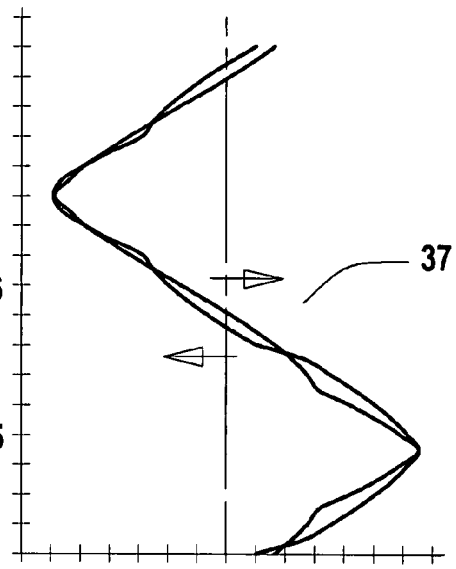
FIG. 5C is the speed curve of FIG. 5B mirrored and superimposed on itself to easily compare the speed curve in both directions of oscillation.
Figure 5A:
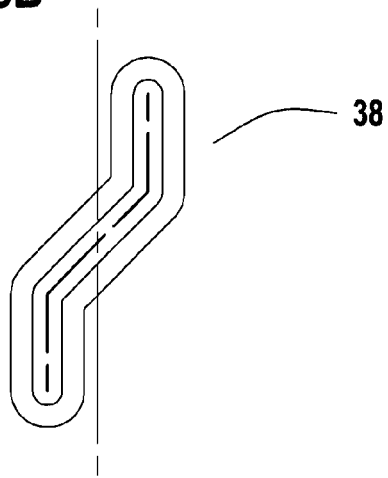
FIG. 5A is the oscillation block of a second idealized oscillation system.

Alternate oscillation system, (FIG. 5) FIGS. 5A, 5B and 5C shows a tri-fold straight-line oscillation block design that yields an improved speed curve 39 over the sinusoidal speed curve of the (standard) prior art oscillation (system) curve of (FIG. 1) FIG. 1D. The oscillation speed curve of (the FIG. 5 system) FIG. 5B includes the characteristics of quicker direction changes 34, 35, a center section 36 flatness (36) degraded from (the FIG. 3 system) FIG. 3A, and an improved retrace 37 of the oscillation speed curve (37).

Figure 6B:
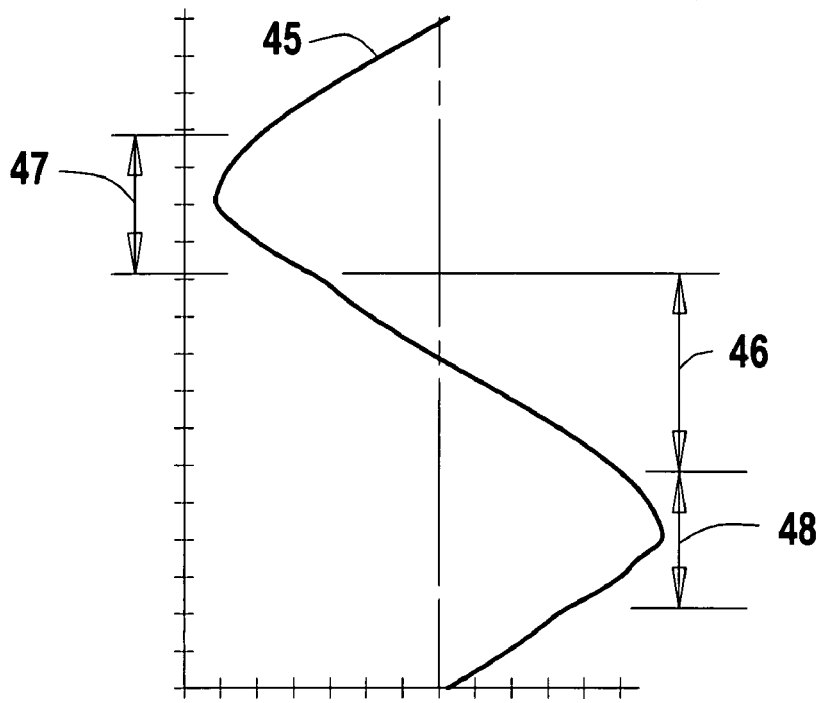
FIG. 6B is the speed curve related to the oscillation block of FIG. 6A.
Figure 6A:
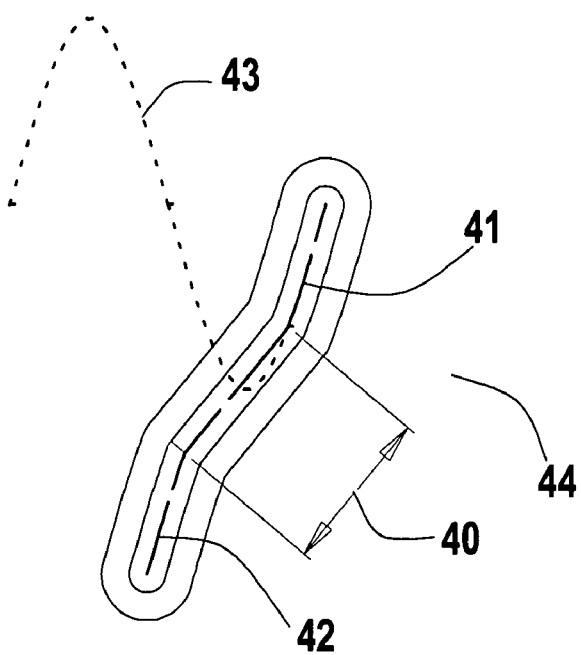
FIG. 6A is the oscillation block embodiment of the invention.

The oscillation system of (FIG. 6) FIGS. 6A and 6B illustrates an oscillation block design 44 which combines the center straight-line section 40 of (the FIG. 5 oscillation system) FIG. 5A with the sinusoidal end sections 41, 42, of (the oscillation system of FIG. 3) FIG. 3A. Waveform extension 43 illustrates the completion of the sinusoidal shape that is the basis of the (FIG. 6) FIG. 6A oscillation block design.

Figure 7:
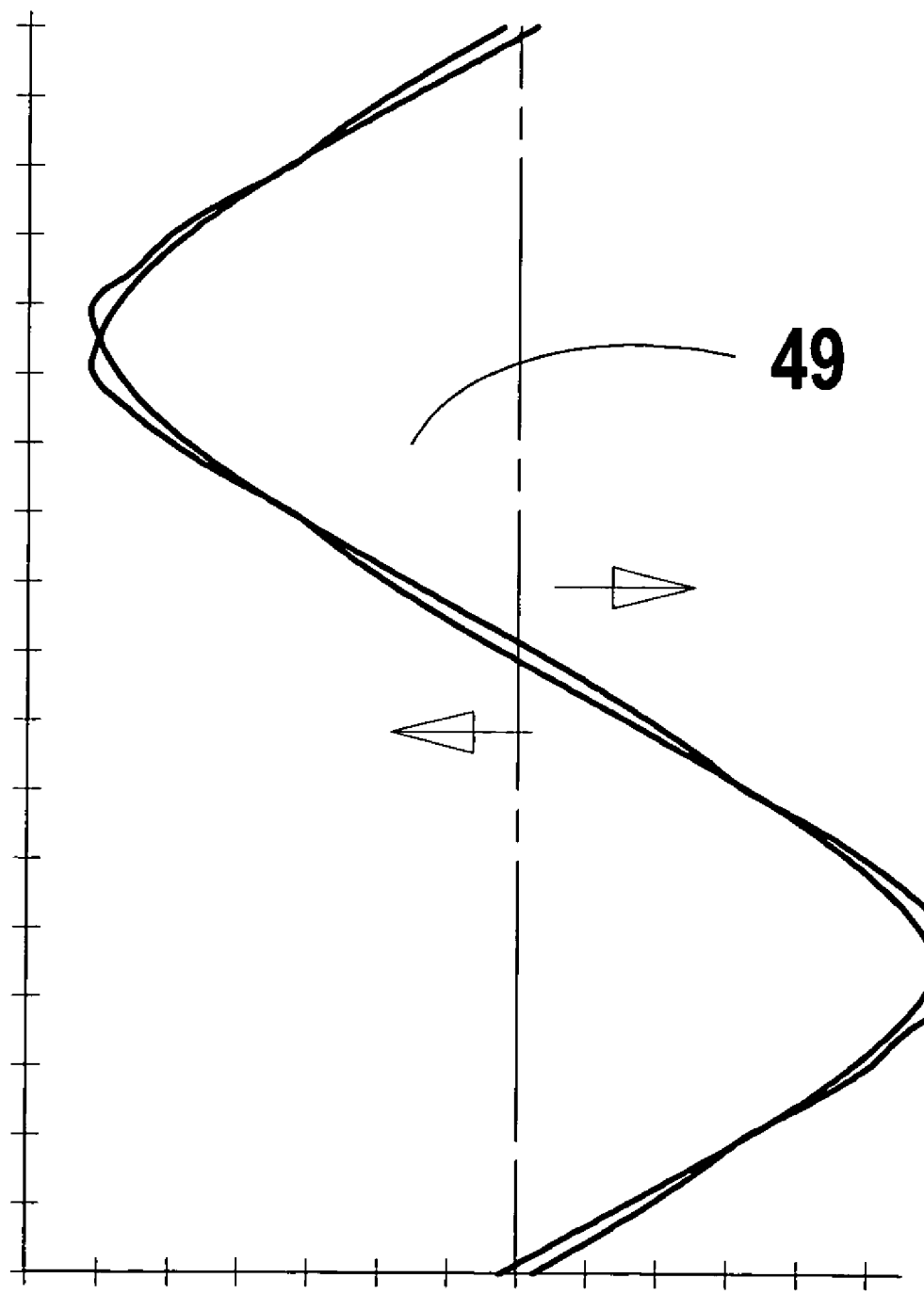
FIG. 7 is the speed curve of FIG. 6B mirrored and superimposed on itself to easily compare the speed curve in both directions of oscillation.

Adding straight line section 40 to the purely sinusoidal oscillation system of (FIG. 3) FIG. 3C both resolves the jamming flaw of the (FIG. 3) FIG. 3C design and produces a speed curve 45 that is substantially improved over either (the FIG. 3 or FIG. 5 systems) FIG. 3A or FIG. 5B. Comparing speed curve 45 to the speed curve (results of FIG. 3) FIG. 3A, speed curve 45 has a flatter mid section 46 and quicker direction changes 47, 48. The mirrored and superimposed drawing of speed curve 45 illustrated in FIG. 7 shows that speed curve 45 also has a substantially improved retrace pattern 49 and overall closely approximates the desired and theoretically perfect speed curve 14. Oscillation speed curve 45 indicates an improved oscillation system in which a sinusoidal correction applied in synchronous opposition to the urging of the oscillation pin's sinusoidal speed curve produces a very flat line wind on its associated spool.

It is understood that changing the length and/or angle of center section 40, the horizontal stretch of sinusoidal shape 41, 43 as well as other dimensions shown on the accompanying figures will be obvious to those with knowledge of the art in order to affect the resultant oscillation speed curves.

The invention claimed is:

1. In a fishing reel with a spool and an oscillation system; said oscillation system including an oscillation gear with an attached driving pin positioned to rotate on a circular path around the central axis of said oscillation gear and an oscillation block driven by said driving pin from within a groove formed therein; an oscillation block design with said groove shaped to induce a substantially sinusoidally shaped correction force that is applied in synchronous opposition to the sinusoidal oscillation speed curve urged by said rotating oscillation pin.

2. The oscillation block of claim 1 in which the centerline of said oscillation block groove is formed as a function of a sinusoidal curve.

3. The oscillation block of claim 2 in which the amplitude of said sinusoidal centerline matches the diameter of said oscillation pin's circular path.

4. The oscillation block of claim 1 in which the centerline of the block groove is shaped by multiple straight line sections connected in series and at angles to each other.

5. The oscillation block of claim 1 in which the centerline of the block groove is shaped with a central straight portion connected to outer sinusoidally shaped portions.

6. The oscillation block of claim 5 in which the amplitude of the sinusoidal portions of the centerline matches the diameter of said oscillation pin's circular path.

* * * * *